(12) United States Patent
Gong et al.

(10) Patent No.: US 11,968,920 B1
(45) Date of Patent: Apr. 30, 2024

(54) SYSTEM FOR MULTI-CHANNEL DATA ACQUISITION AND PRECISION IRRIGATION AND FERTILIZER APPLICATION CONTROL OF CROPS

(71) Applicant: Institute of Environment and Sustainable Development in Agriculture, CAAS, Beijing (CN)

(72) Inventors: Daozhi Gong, Beijing (CN); Lili Gao, Beijing (CN); Xurong Mei, Beijing (CN); Weiping Hao, Beijing (CN); Haoru Li, Beijing (CN); Xuemin Hou, Beijing (CN); Xiaojie Li, Beijing (CN)

(73) Assignee: Institute of Environment and Sustainable Development in Agriculture, CAAS, Beijing (CN)

( * ) Notice: Subject to any disclaimer, the term of this patent is extended or adjusted under 35 U.S.C. 154(b) by 0 days.

(21) Appl. No.: 18/380,861

(22) Filed: Oct. 17, 2023

(30) Foreign Application Priority Data

May 24, 2023 (CN) .......................... 202310587291.8

(51) Int. Cl.
*A01C 21/00* (2006.01)
*A01C 23/00* (2006.01)

(52) U.S. Cl.
CPC .......... *A01C 21/007* (2013.01); *A01C 21/005* (2013.01); *A01C 23/007* (2013.01)

(58) Field of Classification Search
CPC ... A01C 21/007; A01C 21/005; A01C 23/007; A01C 21/00; A01C 23/00
See application file for complete search history.

(56) References Cited

U.S. PATENT DOCUMENTS

2016/0045841 A1* 2/2016 Kaplan ................... C01B 32/05
429/49

* cited by examiner

Primary Examiner — Christopher J. Novosad
(74) Attorney, Agent, or Firm — Nields, Lemack & Frame, LLC (57) ABSTRACT

A system for multi-channel data acquisition and precision irrigation and fertilizer application control of crops involving the following steps: obtaining a soil moisture content and a plant status parameter for plants within each homogeneous area; calculating a required soil moisture content for plants within the homogeneous area based on a difference between the required soil moisture content for plants within the planting area and the soil moisture content for plants within the homogeneous area; obtaining types and quality of required fertilizers for plants within the homogeneous area based on the plant status parameter for plants within the homogeneous area; blending an irrigation water and fertilizer solution required by plants within the homogeneous area; and irrigating plants within each homogeneous area according to the irrigation water and fertilizer solution required by plants within the homogeneous area.

6 Claims, 9 Drawing Sheets

SYSTEM FOR MULTI-CHANNEL DATA ACQUISITION AND PRECISION IRRIGATION AND FERTILIZER APPLICATION CONTROL OF CROPS

CROSS REFERENCE TO RELATED APPLICATION

This patent application claims the benefit and priority of Chinese Patent Application No. 2023105872918, filed with the China National Intellectual Property Administration on May 24, 2023, the disclosure of which is incorporated by reference herein in its entirety as part of the present application.

TECHNICAL FIELD

The present disclosure relates to the technical field of agricultural cultivation, and in particular, to a system for multi-channel data acquisition and precision irrigation and fertilizer application control of crops.

BACKGROUND

With the development of precision agriculture, the precision irrigation and fertilizer application techniques for crops have received increasing attention. Such techniques can precisely control the time, quantity, and positions of irrigation and fertilizer application according to specific requirements of crops and environmental conditions, thus improving the efficiency of water and fertilizer utilization, reducing the environmental pollution, and improving the yield and quality of crops.

However, existing precision irrigation and fertilizer application techniques for crops depend largely on manual observation and experience-based judgment, or use a single sensor, such as a soil humidity sensor, or data from a meteorological station. These methods cannot comprehensively accurately reflect the water and fertilizer requirements of farmlands. Moreover, existing irrigation and fertilizer application control systems for farmlands are often complex to operate, require lots of human and material resource inputs, and cannot realize remote and automatic operations.

SUMMARY

An objective of the present disclosure is to provide a system for multi-channel data acquisition and precision irrigation and fertilizer application control of crops. Efficient, accurate, and comprehensive water and fertilizer requirement detection can be realized by performing multi-channel data acquisition on agricultural products, whereby one-off automatic precision irrigation and fertilizer application can be realized.

To solve the foregoing technical problems, the present disclosure is implemented by the following technical solutions.

The present disclosure provides a system for multi-channel data acquisition and precision irrigation and fertilizer application control of crops, including:

a plant detection unit configured to perform the steps of:
obtaining a plurality of sampling points within a planting area; and
obtaining soil moisture contents and plant status parameters through a plurality of detection channels at the sampling points, respectively, where the plant status parameter includes infrared light reflectance, visible light reflectance, and/or chlorophyll fluorescence;

a requirement pre-estimation unit configured to perform the steps of: obtaining a required soil moisture content for plants within the planting area;
dividing the planting area into a plurality of homogeneous areas according to the soil moisture content and the plant status parameter at each sampling point;
obtaining the soil moisture content and the plant status parameter for plants within each homogeneous area;
calculating a required soil moisture content for plants within the homogeneous area based on a difference between the required soil moisture content for plants within the planting area and the soil moisture content for plants within the homogeneous area; and
obtaining types and quality of required fertilizers for plants within the homogeneous area based on the plant status parameter for plants within the homogeneous area;

a water and fertilizer blending unit configured to perform the step of: blending an irrigation water and fertilizer solution required by plants within the homogeneous area based on the required soil moisture content and the types and quality of the required fertilizers for plants within the homogeneous area; and an areal irrigation unit configured to perform the step of: irrigating plants within each homogeneous area according to the irrigation water and fertilizer solution required by plants within the homogeneous area.

The present disclosure realizes efficient, accurate, and comprehensive detection on water and fertilizer requirements by performing multi-channel data acquisition on crops, and further implements one-off automatic precision irrigation and fertilizer application. In the present disclosure, a plurality of sampling points are obtained in the planting area by the plant detection unit during implementation. The soil moisture content and the plant status parameter (such as infrared light reflectance, visible light reflectance, and chlorophyll fluorescence) are obtained through a plurality of detection channels at each sampling point. Next, a required soil moisture content for plants within the planting area is obtained by the requirement pre-estimation unit. The planting area is divided into a plurality of homogeneous areas according to the soil moisture content and the plant status parameter at each sampling point. The soil moisture content and the plant status parameter for plants within each homogeneous area are then obtained. A required soil moisture content for plants within the homogeneous area is calculated based on a difference between the required soil moisture content for plants within the planting area and the soil moisture content for plants within the homogeneous area. Types and quality of required fertilizers for plants within the homogeneous area are determined based on the plant status parameter for plants within the homogeneous area. Finally, an irrigation water and fertilizer solution required by plants within the homogeneous area is blended by the water and fertilizer blending unit based on the required soil moisture content and the types and quality of the required fertilizers for plants within the homogeneous area. Plants within each homogeneous area are irrigated by the areal irrigation unit according to the irrigation water and fertilizer solution required by plants within the homogeneous area. In conclusion, the present disclosure realizes precision irrigation and fertilizer application for crops and significantly improves the agricultural production efficiency and the yield and quality of crops by an integrated automatic method.

Certainly, the implementation of any product in the present disclosure does not necessarily need to achieve all of the above advantages.

BRIEF DESCRIPTION OF THE DRAWINGS

In order to describe the technical solutions in the embodiments of the present disclosure more clearly, the accompanying drawings required for describing the embodiments are briefly described below. Obviously, the accompanying drawings in the following description show merely some embodiments of the present disclosure, and a person of ordinary skill in the art can further derive other accompanying drawings from these accompanying drawings without creative efforts.

LIST OF REFERENCE NUMERALS

1—plant detection unit, 2—requirement pre-estimation unit, 3—water and fertilizer blending unit, and 4—areal irrigation unit.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments derived from the embodiments of the present disclosure by a person of ordinary skill in the art without creative efforts shall fall within the protection scope of the present disclosure.

To carry out accurate comprehensive irrigation on crops within a planting area, the present disclosure provides the following solutions, thereby simplifying the operation steps of irrigation and fertilizer application and improving the cultivation efficiency of crops.

Figure 1:
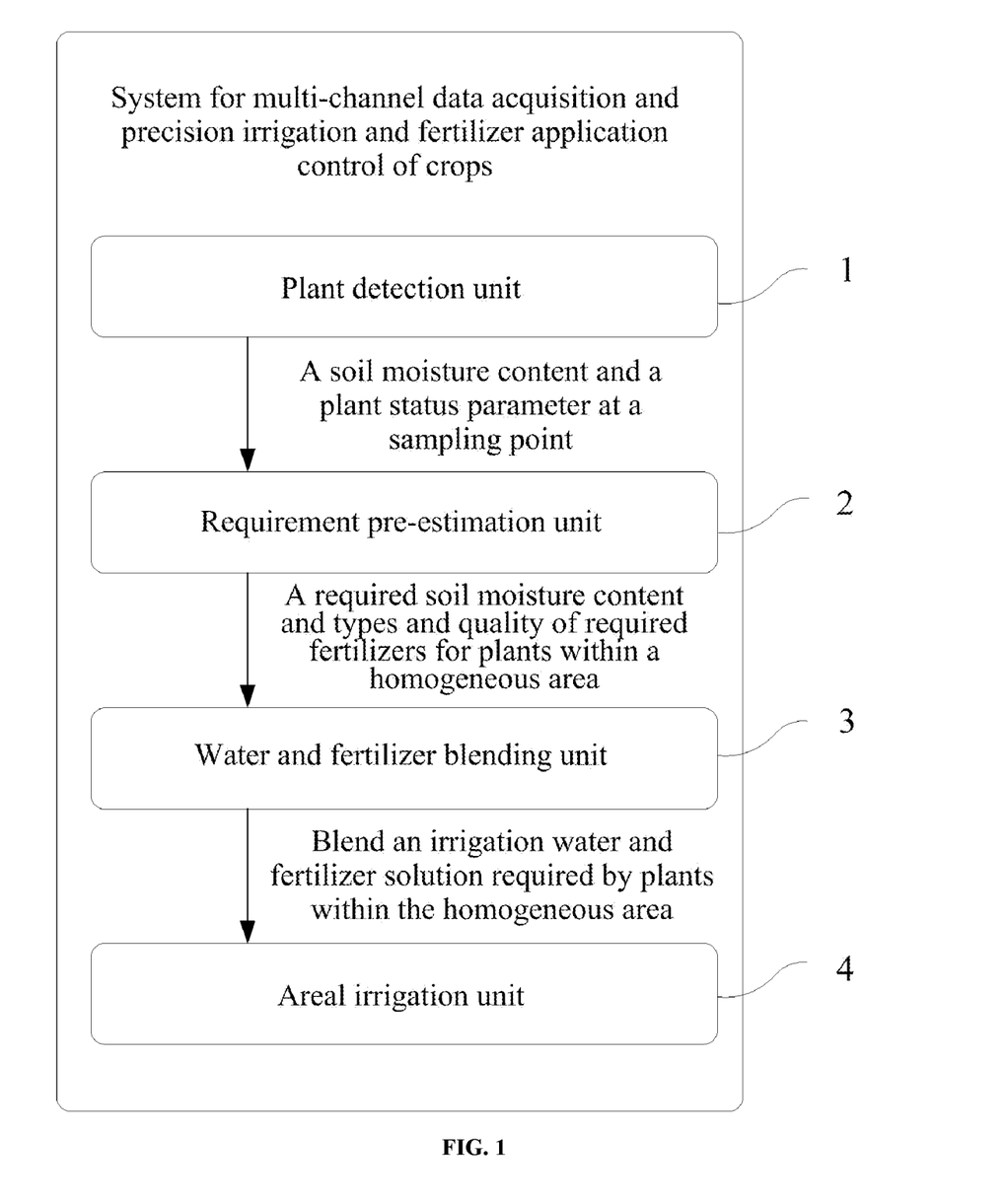
FIG. 1 is a schematic diagram of functional modules and an information flow of a system for multi-channel data acquisition and precision irrigation and fertilizer application control of crops according to an embodiment of the present disclosure.
Figure 2:
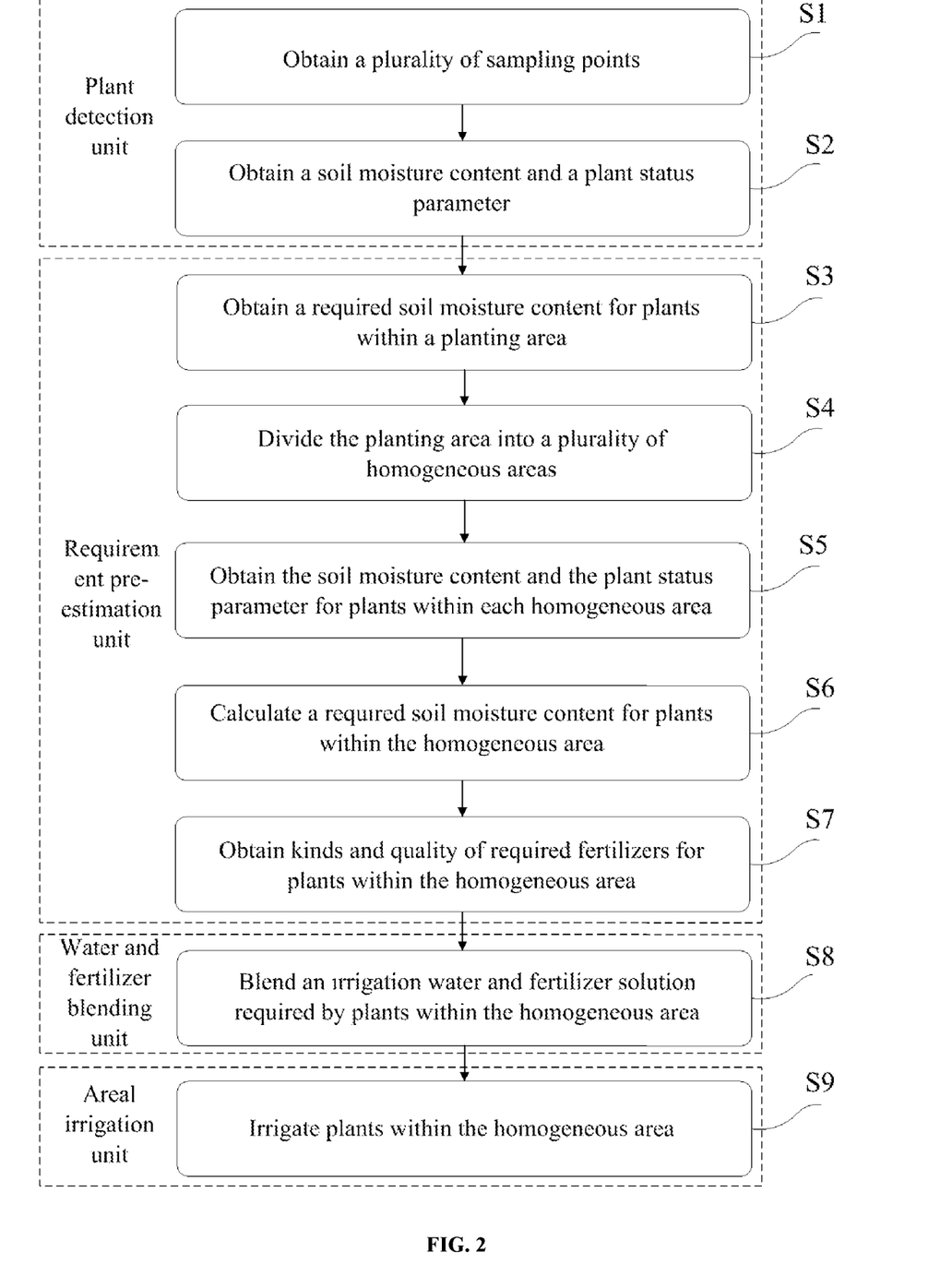
FIG. 2 is a flowchart of a system for multi-channel data acquisition and precision irrigation and fertilizer application control of crops according to an embodiment of the present disclosure.

With reference to FIG. 1 and FIG. 2, the present disclosure provides a system for multi-channel data acquisition and precision irrigation and fertilizer application control of crops. Functional modules of the system may include a plant detection unit 1, a requirement pre-estimation unit 2, a water and fertilizer blending unit 3, and an areal irrigation unit 4. During specific operations, firstly, the plant detection unit 1 is configured to perform step S1: obtain a plurality of sampling points within a planting area. Next, step S2 may be performed: obtain soil moisture contents and plant status parameters through a plurality of detection channels at the sampling points, respectively, where the plant status parameter includes infrared light reflectance, visible light reflectance, and/or chlorophyll fluorescence. In practical use, a vegetation coverage and a common index of productivity are estimated by comparing the infrared light reflectance with the visible light reflectance, and may be used to indirectly assess a requirement of crops for a nitrogen fertilizer. The chlorophyll fluorescence is a parameter that can be used to assess the photosynthetic efficiency and healthy condition of plants. When the nitrogen content in plant leaves is high, the photosynthetic efficiency is usually high, and therefore, the chlorophyll fluorescence can be used to indirectly assess the requirement of crops for a nitrogen fertilizer.

Subsequently, the following step S3 and step S4 may be performed by the requirement pre-estimation unit 2: obtain a required soil moisture content for plants within the planting area; and divide the planting area into a plurality of homogeneous areas according to the soil moisture content and the plant status parameter at each sampling point. Next, step S5 may be performed: obtain the soil moisture content and the plant status parameter for plants within each homogeneous area. Next, step S6 may be performed: calculate a required soil moisture content for plants within the homogeneous area based on a difference between the required soil moisture content for plants within the planting area and the soil moisture content for plants within the homogeneous area. Finally, step S7 may be performed: obtain types and quality of required fertilizers for plants within the homogeneous area based on the plant status parameter for plants within the homogeneous area.

Subsequently, step S8 may be performed by the water and fertilizer blending unit 3: blend an irrigation water and fertilizer solution required by plants within the homogeneous area based on the required soil moisture content and the types and quality of the required fertilizers for plants within the homogeneous area. Finally, step S9 may be performed by the areal irrigation unit 4: irrigate plants within each homogeneous area according to the irrigation water and fertilizer solution required by plants within the homogeneous area.

During the implementation of the above steps, the multi-channel data acquisition technology is utilized, and comprehensive, accurate, and efficient water and fertilizer requirement monitoring is implemented for crops, thereby realizing one-off automatic precision irrigation and fertilizer application. The specific operations include obtaining of sampling points within the planting area, obtaining of the soil moisture content and the plant status parameter, pre-estimation of the soil moisture content required by plants, division of the homogeneous areas, calculation of the required soil moisture content and types and quality of the required fertilizers for plants within the homogeneous area, and preparation of the irrigation water and fertilizer solution for areal irrigation. The present disclosure significantly improves the agricultural production efficiency and the yield and quality of crops by an integrated automatic method.

For the sake of supplementary description, the following executable codes are provided, and explanation is given in the comments section. Bound to the length of the description, only the codes of some core functional modules are disclosed.

```
#include <iostream>
#include <vector>
#include <map>
// An example data structure for the storing sampling
    points and relevant parameters
struct SamplingPoint {
    double soil_moisture;
    double plant_status;
};
// An example data structure for storing the homogeneous
    areas and relevant parameters thereof
struct HomogeneousZone {
    std::vector<SamplingPoint>sampling_points;
    double required soil moisture;
    double required_fertilizer_type;
    double required_fertilizer_mass;
    double irrigation_solution;
};
int main( ){
    // Have obtained data of a plurality of sampling points
    std::vector<SamplingPoint>sampling_points={/*some
        data*/};
    // Have obtained the required soil moisture content for
        plants within the planting area
    double required_soil_moisture=/*some data*/;
    // Divide the planting area into a plurality of homoge-
        neous areas according to the soil moisture content
        and the plant status parameter at each sampling point
    std::vector<HomogeneousZone>homogeneous_zones=
        divide_into_zones(sampling_poin ts);
    // Traverse each homogeneous area
        for (HomogeneousZone &zone:homogeneous_zones)
        {
        // Obtain the soil moisture content and the plant status
            parameter for plants within each homogeneous area
    zone.required_soil_moisture=calculate
        required_soil_moisture(zone.sampling_points,
        required_soil_moisture);
    // Obtain types and quality of required fertilizers for
        plants within the homogeneous area
    zone.    required_fertilizer_type    get_required_
        fertilizer_type(zone.sampling_points);
    zone.required_fertilizer_mass=get_required_fertilizer_mass
        (zone.sampling_points);
    // Blend an irrigation water and fertilizer solution
        required by plants within the homogeneous area
        based on the required_soil_moisture content and the
        types and quality of the required fertilizers for plants
        within the homogeneous area
    zone.irrigation_solution=mix_irrigation_solution
        (zone.required_soil_moisture, zone.required_fertil-
        izer_type, zone.required_fertilizer_mass);
    // Irrigate plants within each homogeneous area accord-
        ing to the irrigation water and fertilizer solution
        required by plants within the homogeneous area
        irrigate_plants(zoneirrigation_solution);
}
    return 0;
}
```

Figure 3:
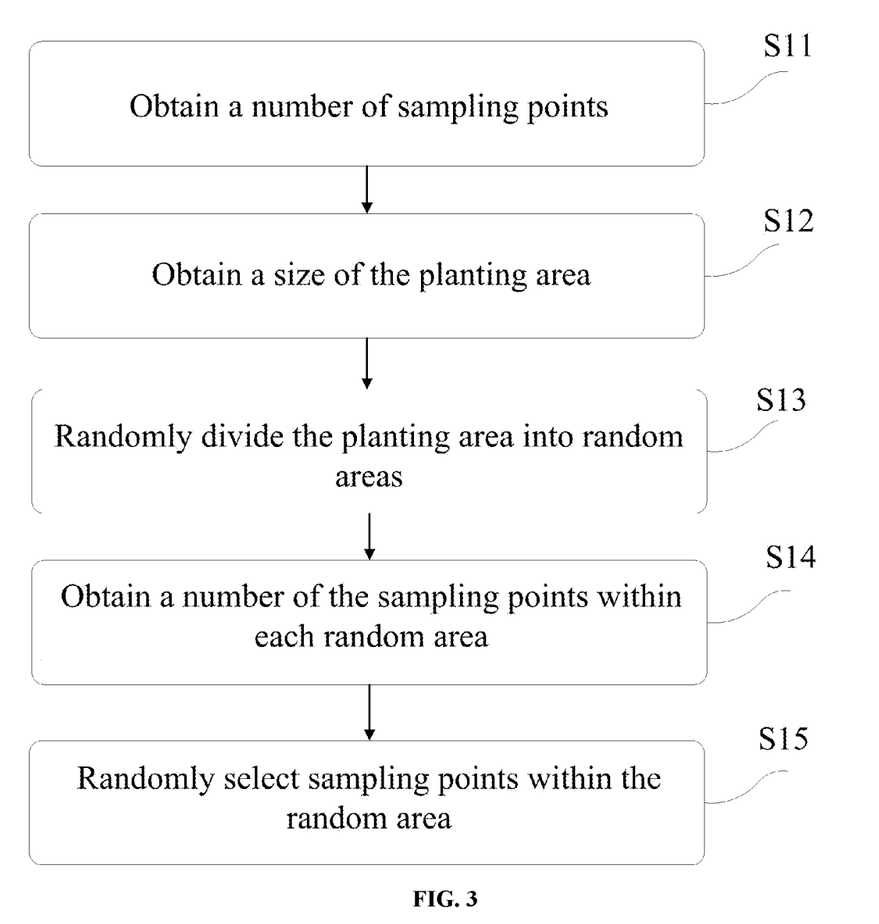
FIG. 3 is a flowchart of step S1 according to an embodiment of the present disclosure.

With reference to FIG. 3, to enable the selected sampling points to fully reflect the growth status of plants within the planting area, it is necessary to guarantee certain uniformity in case of random sampling. In view of this, in the specific implementation process of step S1, step S11 may be firstly performed: obtain a number of the sampling points. Next, step S12 may be performed: obtain a size of the planting area. Next, step S13 may be performed: randomly divide the planting area into a plurality of random areas different in size and shape based on the size of the planting area. Next, step S14 may be performed: allocate the plurality of sampling points based on a ratio of the size of each random area to obtain a number of the sampling points within each random area. Finally, step S15 may be performed: randomly select location points as sampling points within each random area according to the number of the sampling points within the random area.

For the sake of supplementary description, the following executable codes are provided, and explanation is given in the comments section. Bound to the length of the description, only the codes of some core functional modules are disclosed.

Figure 4:
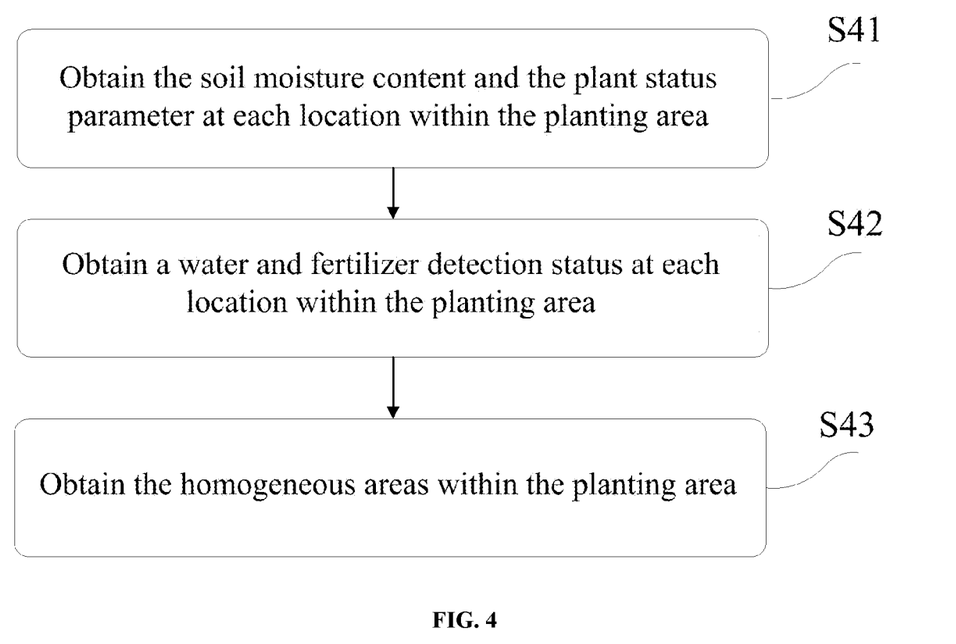
FIG. 4 is a flowchart of step S4 according to an embodiment of the present disclosure.

```
#include <iostream>
#include <vector>
#include <map>
#include <random>
// Define a structure to represent a random area
struct RandomArea {
    double area;
    std::vector<std::pair<double, double>>sample_
        points; // Save x and y coordinates of the sampling
        point
};
int main( ){
    // Obtain the number of the sampling points
    int sample_point_count=/*some data*/;
    // Obtain the size of the planting area
    double total_area=/*some data*/;
    // Randomly divide the planting area into a plurality of
        random areas different in size and shape
    std::vector<RandomArea>random areas=divide_into
        random areas(total_area);
    // Allocate the plurality of sampling points based on the
        ratio of the size of each random area
    for (RandomArea &area:random areas) {
        int sample_points_in_this_area=round((area.area/to-
            tal_area)*sample_point_count);
        // Randomly select location points as sampling
            points within the random area
        for (int i=0; i<sample_points_in_this_area; ++i) {
            std::pair<double, double>sample_point=generate
                random_point(area);
            area. sample_points.push_back(sample_point);
        }
    }
    return 0;
}
``` with reference to FIG. 4, to put locations with similar plant status parameters and similar soil moisture contents into the same homogeneous area, in the specific implementation process of step S4, step S41 may be firstly performed: obtain the soil moisture content and the plant status parameter at each location within the planting area according to locations of the sampling points within the planting area and the soil moisture content and the plant status parameter at each sampling point. Next, step S42 may be performed: obtain a water and fertilizer detection status at each location within the planting area according to the soil moisture content and the plant status parameter at each location within the planting area. Finally, step S43 may be performed: obtain the plurality of homogeneous areas formed by locations having a same water and fertilizer detection status within the planting area according to the water and fertilizer detection status at each location within the planting area.

For the sake of supplementary description, the following executable codes are provided, and explanation is given in the comments section. Bound to the length of the description, only the codes of some core functional modules are disclosed.

```
#include <iostream>
#include <vector>
#include <map>
// Define a structure to represent a sampling point
struct SamplingPoint {
   double x;
   double y;
   double soil moisture;
   double plant status;
};
// Define a structure to represent a homogeneous area
struct HomogeneousZone {
   std::vector<SamplingPoint>points;
};
int main( ){
   I/Have obtained data of a plurality of sampling points
   std::vector<SamplingPoint>sampling_points={/*some data*/};
   // Obtain the soil moisture content and the plant status parameter at each location within the planting area according to the locations of the sampling points within the planting area and the soil moisture content and the plant status parameter at each sampling point
   std::map<std::pair<double, double>, std::pair<double, double>>position_to_status=get_position_status(sampling_points);
   // Obtain a water and fertilizer detection status at each location within the planting area according to the soil moisture content and the plant status parameter at each location within the planting area
   std::map<std::pair<double, double>, int>position_to_water_fertilizer_status=get_water_fertilizer_status(position_to_status);
   // Obtain the plurality of homogeneous areas formed by locations having a same water and fertilizer detection status within the planting area according to the water and fertilizer detection status at each location within the planting area
   std::vector<HomogeneousZone>homogeneous_zones=get_homogeneous_zones(position_to_water_fertilizer_status);
   return 0;
}
```

Figure 5:
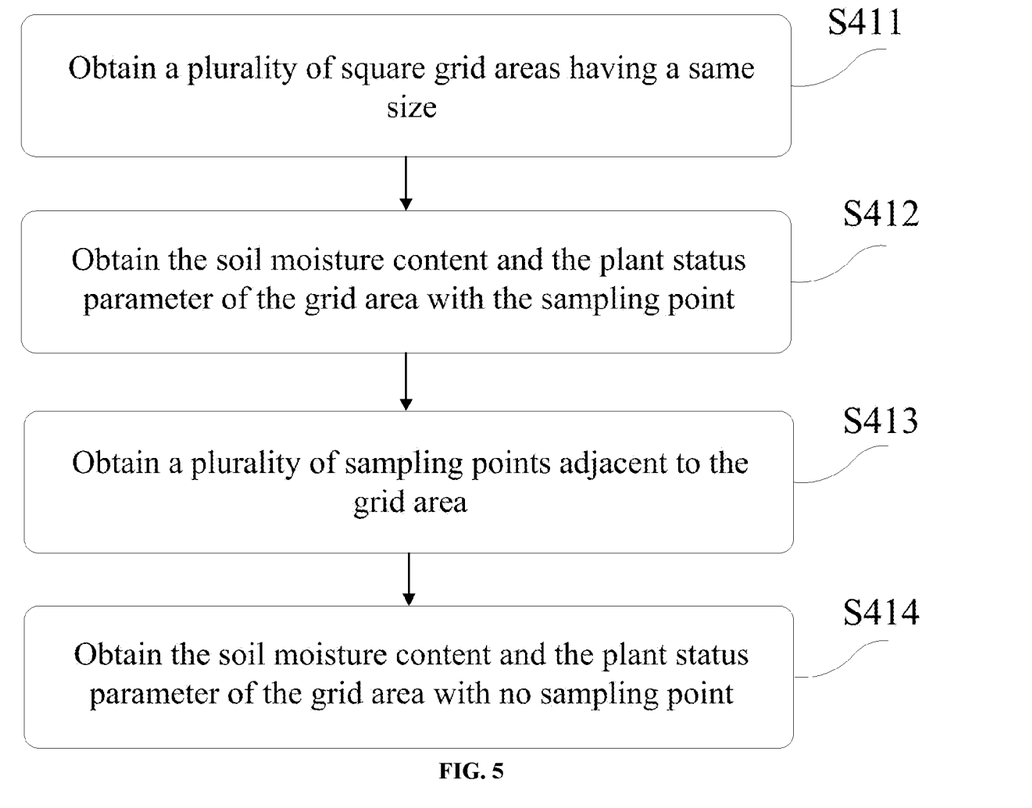
FIG. 5 is a flowchart of step S41 according to an embodiment of the present disclosure.

With reference to FIG. 5, due to the limited number of the sampling points, to obtain accurate soil moisture content and plant status parameter at each location within the planting area, In the specific implementation process of step S41, step S411 may be firstly performed: grid the planting area to obtain a plurality of square grid areas having a same size, where there is only one or no sampling point within the grid area. Next, step S412 may be performed: for the grid area with the sampling point, use the soil moisture content and the plant status parameter at the sampling point as the soil moisture content and the plant status parameter of the grid area with the sampling point. Next, step S413 may be performed: for the grid area with no sampling point, obtain a plurality of sampling points adjacent to the grid area. Finally, step S414 may be performed: obtain the soil moisture content and the plant status parameter of the grid area with no sampling point according to the soil moisture contents and the plant status parameters at the plurality of sampling points adjacent to the grid area with no sampling point.

For the sake of supplementary description, the following executable codes are provided, and explanation is given in the comments section. Bound to the length of the description, only the codes of some core functional modules are disclosed.

```
#include <iostream>
#include <vector>
#include <map>
// Define a structure to represent a sampling point
struct SamplingPoint {
   double x;
   double y;
   double soil moisture;
   double plant status;
};
// Define a structure to represent a grid area
struct GridArea}
double x;// x coordinate at the upper left corner of the grid area
double y;// y coordinate at the upper left corner of the grid area
double soil_moisture;
double plant_status;
bool has_sample_point;
};
int main( ){
   // Have obtained data of a plurality of sampling points
   std::vector<SamplingPoint>sampling_points={/*some data*/};
   // Grid the planting area to obtain a plurality of square grid areas having a same size
   std::vector<GridArea>grid_areas=divide_into_grid_areas( );
   // Traverse the plurality of grid areas
   for (GridArea &grid:grid_areas) {
      // Check whether there is the sampling point in the current grid area
      SamplingPoint*sample_point=get_sample_point_for_grid(grid,sampling_points);
      if (sample_point)
      // If there is the sampling point, use the soil moisture content and the plant status parameter at the sampling point as the soil moisture content and the plant status parameter of the grid area with the sampling point
      grid. soil_moisture=sample_point→soil_moisture;
      grid. plant_status=sample_point→plant_status;
      grid.has_sample_point=true;
   } else {
      // If this is no sampling point, obtain a plurality of sampling points adjacent to the grid area
      std::vector<SamplingPoint>adjacent_sample_points=get_adjacent_sample_points(grid, sampling_points);
      // Obtain the soil moisture content and the plant status parameter of the grid area with no sampling point according to the soil moisture contents and the plant status parameters at the plurality of sampling points adjacent to the grid area with no sampling point
```

```
    std::pair<double,
        double>interpolated_values=interpolate_values
        (adjacent_sample_points);
    grid. soil_moisture=interpolated_values.first;
    grid. plant_status=interpolated_values.second;
    grid.has_sample_point=false;
    }
  }
  return 0;
}
```

Figure 6:
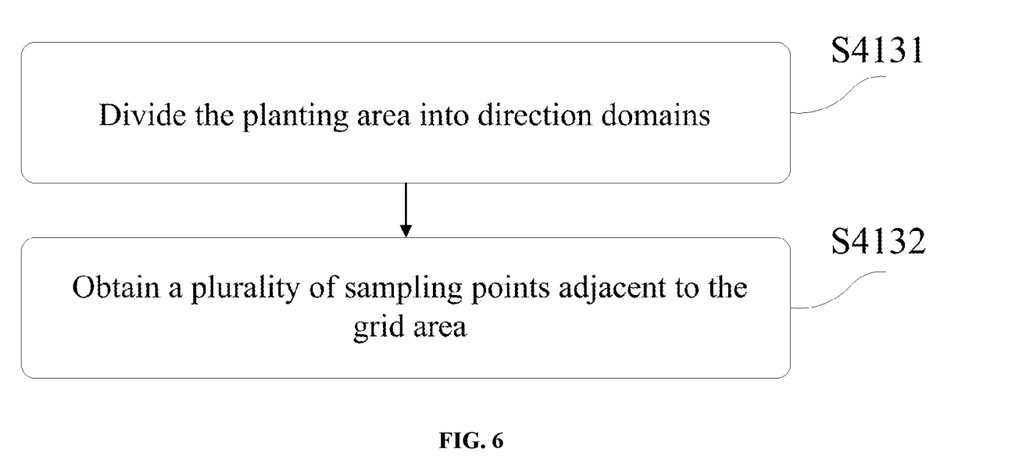
FIG. 6 is a flowchart of step S413 according to an embodiment of the present disclosure.

With reference to FIG. 6, to make the soil moisture content and the plant status parameter pre-estimated and supplemented for the grid area with no sampling point more accurate, a sufficient reference needs to be made to neighboring effective sampling points. In view of this, in the specific implementation process of step S413, step S4131 may be firstly performed: divide the planting area into four direction domains by two symmetry axes, perpendicular to each other, of the grid area. Next, step S4132 may be performed: take the sampling points closest to a center point of the grid area as the plurality of sampling points adjacent to the grid area within each direction domain.

For the sake of supplementary description, the following executable codes are provided, and explanation is given in the comments section. Bound to the length of the description, only the codes of some core functional modules are disclosed.

```
#include <iostream>
#include <vector>
#include <cmath>
// Define a structure to represent a sampling point
struct SamplingPoint}
    double x;
    double y;
    double soil_moisture;
    double plant_status;
};
// Define a structure to represent a grid area
struct GridArea}
    double x; // x coordinate at the upper left corner of the
        grid area
    double y; // y coordinate at the upper left corner of the
        grid area
    double width; // Width of the grid area
    double width; // Height of the grid area
    double soil_moisture;
    double plant_status;
    bool has_sample_point;
};
// Calculate a distance between two points
double calculate_distance(double x1, double y1, double
    x2, double y2){
    return sqrt(pow(x2−x1, 2)+pow(y2−y1, 2));
}
// Obtain a plurality of sampling points adjacent to the grid
    area
std::vector<SamplingPoint>get_adjacent_sample_points
    (const         GridArea&grid,       const    std::
    vector<SamplingPoint>& sampling_points) {
    // Coordinates of the center point of the grid area
    double center_x=grid.x+grid.width/2;
    double center_y=grid.y+grid.height/2;
    // Initialize that the distances of the closest sampling
        points of the four direction domains are infinite
    double distances[4]={INFINITY, INFINITY, INFINITY, INFINITY};
    SamplingPoint closest_points[4];
    // Traverse the plurality of sampling points
    for (const SamplingPoint& point: sampling_points) {
        // Determine which direction domain the sampling
            point is in
        int quadrant;
        if (point.x>=center_x && point.y>=center_y) {
        quadrant=0; // first quadrant
        else if (point.x<center_x && point.y>=center_y) {
        quadrant=1; // second quadrant
        else if (point.x<center_x && point.y<center_y) {
        quadrant=2; // third quadrant
        }else {
        quadrant=3; // fourth quadrant
        }
        // Calculate the distance between the sampling point
            and the center point of the grid area
        double distance=calculate_distance(center_x, center_y,point.x, point.y);
        // If the sampling point is closer to the center point
            of the grid area, updating the closest sampling
            point
        if (distance<distances[quadrant]) {
        distances [quadrant]=distance;
        closest_points [quadrant]=point;
        }
    }
    // Return to the closest sampling_points within the four
        direction domains
    std::vector<SamplingPoint>adjacent_sample_points
        (closest_points,closest_points+4);
    return adjacent_sample_points;
```

Figure 7:
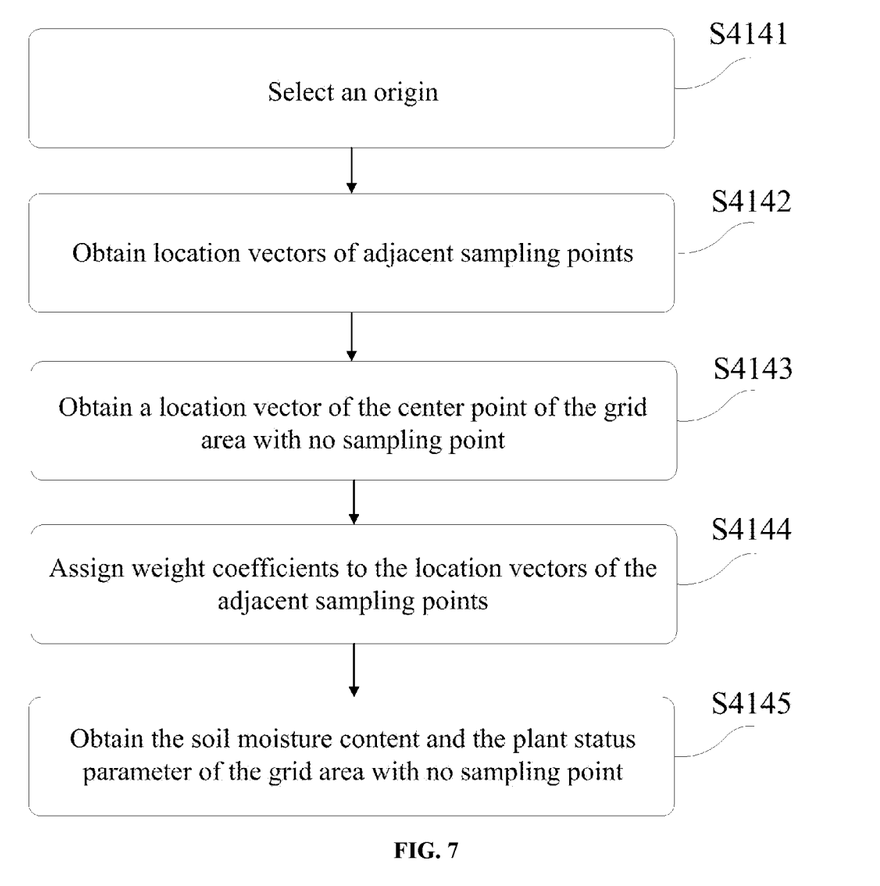
FIG. 7 is a flowchart of step S414 according to an embodiment of the present disclosure.

With reference to FIG. 7, to perform accurate quantitative calculation on the soil moisture content and the plant status parameter of the grid area with no sampling point, in the specific implementation process of step S414, step S4141 may be firstly performed: select any point as an origin. Next, step S4142 may be performed: obtain location vectors of adjacent ones of the plurality of sampling points according to the origin and locations of the plurality of sampling points adjacent to the grid area with no sampling point. Next, step S4143 may be performed: obtain a location vector of the center point of the grid area with no sampling point according to the origin and a location of the center point of the grid area with no sampling point. Next, step S4144 may be performed: assign weight coefficients to the location vectors of the adjacent ones of the plurality of sampling points such that weighted vector sum of the location vectors of the adjacent ones of the plurality of sampling points is equal to the location vector of the center point of the grid area with no sampling point. Finally, step S4145 may be performed: weight and accumulate the soil moisture contents and the plant status parameters at the adjacent ones of the plurality of sampling points according to the weight coefficients to obtain the soil moisture content and the plant status parameter of the grid area with no sampling point.

For the sake of supplementary description, the following executable codes are provided, and explanation is given in the comments section. Bound to the length of the description, only the codes of some core functional modules are disclosed.

```
#include <iostream>
#include <vector>
#include <cmath>
// Define a structure to represent a sampling point
struct SamplingPoint {
    double x;
    double y;
```

```
    double soil_moisture;
    double plant_status;
};
// Define a structure to represent a grid area
struct GridArea {
    double x; // x coordinate at the upper left corner of the
        grid area
    double y; // y coordinate at the upper left corner of the
        grid area
    double width; // Width of the grid area
    double width; // Height of the grid area
    double soil_moisture;
    double plant_status;
    bool has_sample_point;
};
// Calculate a distance between two points
double calculate_distance(double x1, double y1, double
    x2, double y2){
    return sqrt(pow(x2−x1, 2)+pow(y2−y1, 2));
}
// Interpolate the soil_moisture content and the plant_sta-
    tus parameter
std::pair<double, double>interpolate_values(const Gri-
    dArea& grid,const std::vector<SamplingPoint>& adja-
    cent_sample_points)
    double center_x=grid.x+grid.width/2;
    double center_y=grid.y+grid.height/2;
    // Initialize an accumulator
    double moisture_accumulator=0.0;
    double status_accumulator=0.0;
    double weight_accumulator=0.0;
    // Traverse adjacent sampling_points
        for (const SamplingPoint& point: adjacent_
            sample_points)
        // Calculate the distance between the sampling point
            and the center point of the grid area, and the
            shorter the distance, the greater the weight.
        double distance=calculate_distance(center_x, cen-
            ter_y,point.x, point.y);
        double weight=1/distance;
        // Accumulate the soil moisture contents and the
            plant status parameters using weights
        moisture_accumulator+=weight*point. soil_mois-
            ture;
        status_accumulator+=weight*point.plant_status;
        weight_accumulator+=weight;
    }
    // Calculate weighted average soil moisture content and
        plant status parameter
    double interpolated_moisture=moisture_accumulator/
        weight_accumulator;
    double    interpolated_status=status_accumulator/
        weight_accumulator;
    return std::make_pair(interpolated_moisture, interpo-
        lated_status);
}
```

Figure 8:
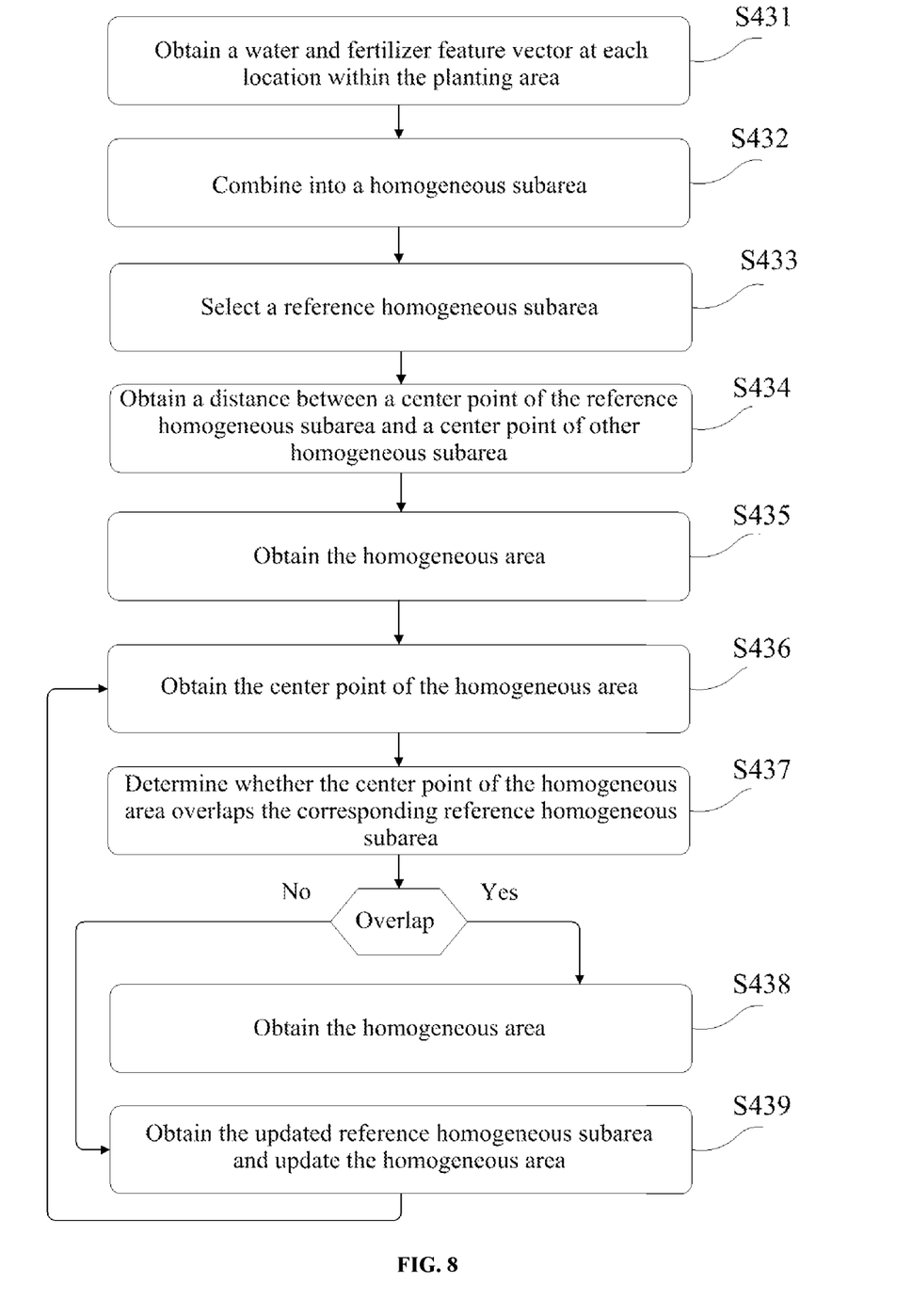
FIG. 8 is a first flowchart of step S43 according to an embodiment of the present disclosure.

With reference to FIG. 8, to cluster the locations with similar plant status parameters and similar soil moisture contents into the same homogeneous area rather than cluster the exactly identical locations into the same homogeneous area, In the specific implementation process of step S43, step S431 may be firstly performed: arrange the water and fertilizer detection status at each location within the planting area according to a set numerical value arrangement manner to obtain a water and fertilizer feature vector at each location within the planting area. Next, step S432 may be performed: combine locations having a same water and fertilizer feature vector within the planting area into a homogeneous subarea. Next, step S433 may be performed: select a plurality of homogeneous subareas from all the homogeneous subareas as reference homogeneous subareas. Next, step S434 may be performed: obtain a distance between a center point of the reference homogeneous subarea and a center point of other homogeneous subarea. Next, step S435 may be performed: combine the other homogeneous subarea and the reference homogeneous subarea of which the center points are closest to each other into the homogeneous area. Next, step S436 may be performed: obtain a center point of the homogeneous area. Next, step S437 may be performed: determine whether the center point of the homogeneous area overlaps the corresponding reference homogeneous subarea. If yes, step S438 may be then performed: obtain the homogeneous area; and if no, step S439 may be performed finally: take the center point of the homogeneous area as an updated reference homogeneous subarea and update the homogeneous area.

For the sake of supplementary description, the following executable codes are provided, and explanation is given in the comments section. Bound to the length of the description, only the codes of some core functional modules are disclosed.

```
#include <iostream>
#include <vector>
#include <cmath>
#include <map>
// Define a structure to represent a homogeneous subarea
struct HomogeneousSubArea {
    double x; // x coordinate of the center of the subarea
    double y; // y coordinate of the center of the subarea
    double characteristic_vector; // Water and fertilizer fea-
        ture vector
};
// Define a structure to represent a homogeneous area
struct HomogeneousArea {
    double x; // x coordinate of the center of the area
    double y; // y coordinate of the center of the area
    std::vector<HomogeneousSubArea>subAreas;
};
// Calculate a distance between two points
double calculate_distance(double x1, double y1, double
    x2, double y2){
    return sqrt(pow(x2−x1, 2)+pow(y2−y1, 2));
}
// Cluster the homogeneous subareas to generate the
    homogeneous area
std::vector<HomogeneousArea>cluster_subAreas(const
    std::vector<HomogeneousSubArea>& subAreas) {
    std::map<double, HomogeneousArea>clusters;
    // Allocate each homogeneous subarea to the closest
        homogeneous area
    for (const HomogeneousSubArea& subArea:subAreas)
    {
        double min_distance=std::numeric_limits<double>::
            max( );
        double closest_cluster=0.0;
        for (const auto& cluster:clusters) {
            double    distance=calculate_distance(cluster.sec-
                ond.x,cluster.second.y, subArea.x, subArea.y);
```

```
            if (distance<min_distance) {
                min_distance=distance;
                closest_cluster=cluster.first;
            }
    }
    // If the closest homogeneous area is found, add the
       homogeneous subarea to the area
    // If no closest homogeneous area is found, create a new
       homogeneous area
    if (min_distance<1.0) {// Here, 1.0 is a threshold which
       needs to be adjusted according to the practical situ-
       ation.
        clusters    [closest_cluster].subAreas.push_back(sub-
           Area);
    } else {
        HomogeneousArea newArea;
        newArea.x=subArea.x;
        newArea.y=subArea.y;
        newArea. subAreas. push_back(subArea);
        clusters [subArea. characteristic_vector]=newArea;
    }
}
// Transform the clustering result from map to vector
std::vector<HomogeneousArea>result;
for (const auto& cluster:clusters) {
    result.push_back(cluster.second);
}
    return result;
}
```

Figure 9:
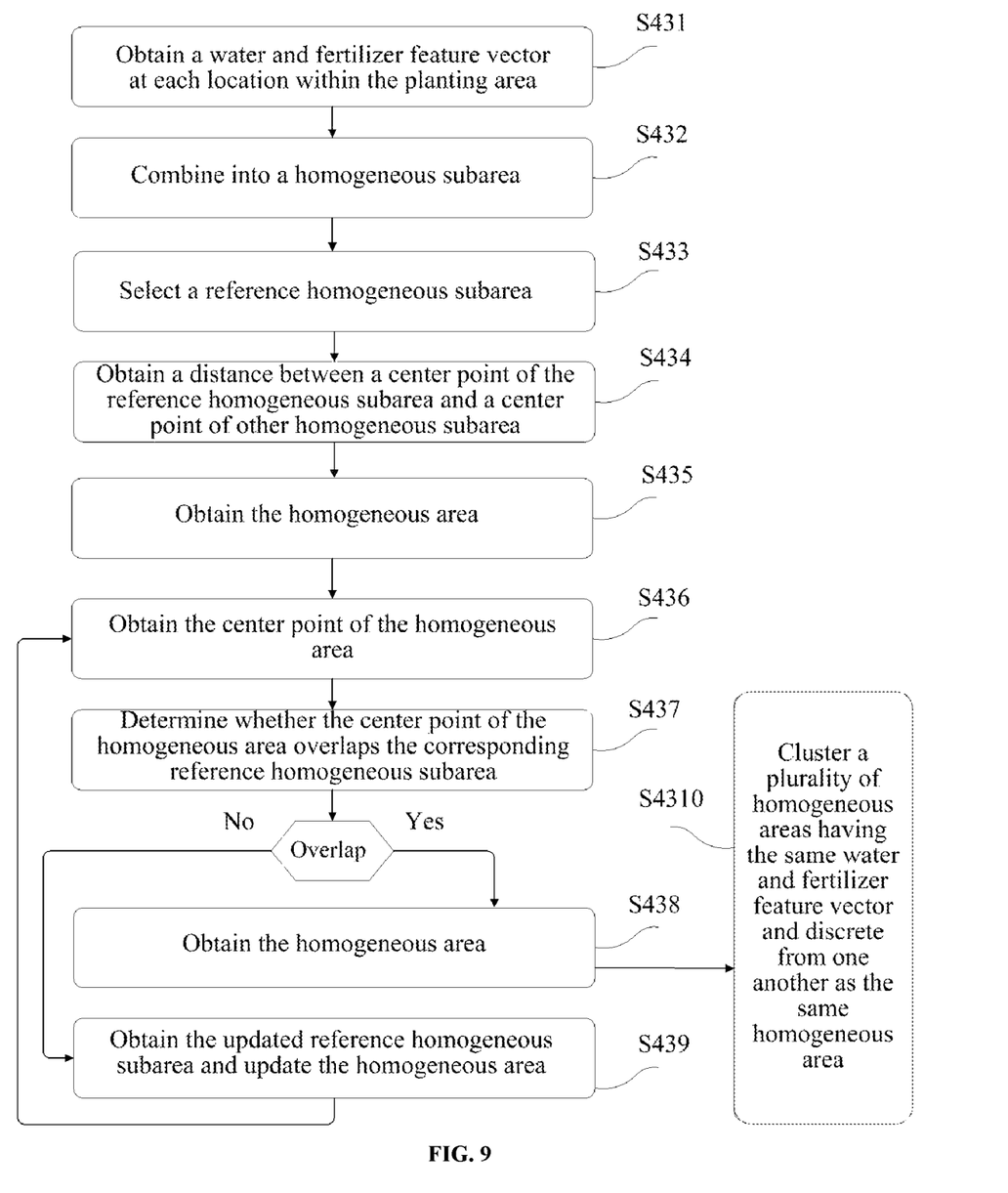
FIG. 9 is a second flowchart of step S43 according to an embodiment of the present disclosure.

With reference to FIG. 9, in another embodiment, the plurality of homogeneous areas distributed within the planting area may have the same water and fertilizer detection status, and although not adjoining spatially, may be communicated by parallel or tandem pipelines, and thus can be incorporated into the same homogeneous area. In view of this, in the implementation process of step S43, step S431 may be firstly performed: arrange the water and fertilizer detection status at each location within the planting area according to a set numerical value arrangement manner to obtain a water and fertilizer feature vector at each location within the planting area. Next, step S432 may be performed: combine locations having a same water and fertilizer feature vector within the planting area into a homogeneous subarea. Next, step S433 may be performed: select a plurality of homogeneous subareas from all the homogeneous subareas as reference homogeneous subareas. Next, step S434 may be performed: obtain a distance between a center point of the reference homogeneous subarea and a center point of other homogeneous subarea. Next, step S435 may be performed: combine the other homogeneous subarea and the reference homogeneous subarea of which the center points are closest to each other into the homogeneous area. Next, step S436 may be performed: obtain a center point of the homogeneous area. Next, step S437 may be performed: determine whether the center point of the homogeneous area overlaps the corresponding reference homogeneous subarea. If yes, step S438 may be then performed: obtain the homogeneous area; and if no, step S439 may be then performed: take the center point of the homogeneous area as an updated reference homogeneous subarea and update the homogeneous area. Finally, step S4310 may be performed: cluster a plurality of homogeneous areas having the same water and fertilizer feature vector and discrete from one another as the same homogeneous area.

For the sake of supplementary description, the following executable codes are provided, and explanation is given in the comments section. Bound to the length of the description, only the codes of some core functional modules are disclosed.

```
#include <iostream>
#include <vector>
#include <algorithm>
#include <cmath>
struct Grid {
    double x, y; // Coordinates of the center point
    double status; // Water and fertilizer detection status
};
struct HomogeneousArea {
    std::vector<Grid>grids;
    double x, y; // Coordinates of the center point
    double status; // Water and fertilizer detection status
};
double calculateDistance(Grid a, Grid b) {
    return sqrt(pow(a.x-b.x, 2)+pow(a.y-b.y, 2));
}
std::vector<HomogeneousArea>getHomogeneousAreas
    (std::vector<Grid>&grids) {
    std::sort(grids.begin( ), grids.end( ), [ ](const Grid& a,
        constGrid& b) {
        return a.status<b.status;
    });
    std::vector<HomogeneousArea>homogeneousAreas;
    for (Grid& grid:grids) {
        bool found=false;
        for (HomogeneousArea& area:homogeneousAreas)
        {
            if (area.status==grid. status) {
                area.grids.push_back(grid);
                area.x=(area.x*(area.grids.size(    )-1)+grid.x)/
                    area.grids.size(;
                area.y=(area.y*(area.grids.size(    )-1)+grid.y)/
                    area.grids.size(;
                found=true;
                break;
            }
        }
        if (! found) {
            homogeneousAreas.push_back(1    {grid},    grid.x,
                grid.y,grid. status 1);
        }
    }
    for (size_t i=0; i<homogeneousAreas.size( ) i++) {
    HomogeneousArea& area=homogeneousAreas[i];
    double    minDistance=std::numeric_limits<double>::
        max( );
    size_t closestIndex;
    for (size_tj=0; j<homogeneousAreas.size( ); j++) {
        if (i==j) continue;
        HomogeneousArea&   otherArea=homogeneousAreas
            [j];
        double distance=calculateDistance({area.x, area.y, 0},
            {otherArea.x, otherArea.y, 0});
        if (distance<minDistance) {
            minDistance=distance;
            closestIndex=j;
        }
    }
    if (minDistance>1.0) {// This distance threshold needs to
        be set according to the actual situations.
        homogeneousAreas   [closestIndex].grids.insert(homoge-
            neousAreas [clos estIndex].grids.en d( ),
            area.grids.begin( ),
            area.grids.end( ));
```

Figure 10:
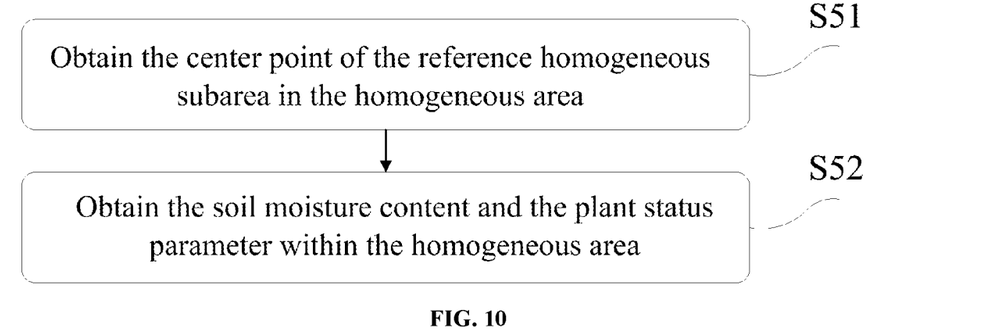
FIG. 10 is a flowchart of step S5 according to an embodiment of the present disclosure.

```
      homogeneousAreas.erase(homogeneousAreas.
        begin( )+i);
      i—;
      }
   }
   return homogeneousAreas;
}
```
With reference to FIG. 10, since the soil moisture contents and the plant status parameters for plants at different locations within the same homogeneous area are not completely identical, to select representative values therefrom to blend the irrigation water and fertilizer solution required by all the plants within the entire homogeneous area, in the implementation process of step S5, step S51 may be firstly performed: obtain the center point of the reference homogeneous subarea in the homogeneous area. Step S52 may be then performed: obtain the soil moisture content and the plant status parameter at the sampling point closest to the center point of the corresponding reference homogeneous subarea in the homogeneous area as soil moisture content and the plant status parameter for plants within the homogeneous area.

For the sake of supplementary description, the following executable codes are provided, and explanation is given in the comments section. Bound to the length of the description, only the codes of some core functional modules are disclosed.

```
#include <iostream>
#include <vector>
#include <limits>
#include <cmath>
struct SamplingPoint {
    double x, y; // Coordinates of the sampling point
    double soilMoisture; // Soil moisture content
    double plantStatus; // Plant status parameter
};
struct HomogeneousArea {
    double x, y; // Coordinates of the center point of the
        homogeneous area
    std::vector<SamplingPoint>samplingPoints;    // The
        sampling points within the homogeneous area
};
double calculateDistance(double x1, double y1, double
    x2, double y2){
    return sqrt(pow(x2-x1, 2)+pow(y2-y1, 2));
}
SamplingPoint    getClosestSamplingPoint(Homoge-
    neousArea& area) {
double    minDistance=std::numeric_limits<double>::
    max( );
SamplingP oint closestSamplingPoint;
for (SamplingPoint& point:area.samplingPoints)}
    double    distance=calculateDistance(area.x,    area.y,
        point.x,point.y);
    if (distance<minDistance)
        minDistance=distance;
        closestSamplingPoint=point;
    }
}
return closestSamplingPoint;
}
```

In conclusion, the present disclosure successfully realizes comprehensive, accurate, and efficient monitoring by performing multi-channel data acquisition on crops in the implementation process, thus promoting one-off automatic precision irrigation and fertilizer application. In the specific operations, a plurality of sampling points are obtained in the planting area by the plant detection unit. Soil moisture contents and plant status parameters are obtained through a plurality of detection channels at the sampling points. Next, a required soil moisture content for plants within the planting area is obtained by the requirement pre-estimation unit. The planting area is divided into a plurality of homogeneous areas according to the soil moisture content and the plant status parameter at each sampling point. Next, the soil moisture content and the plant status parameter for plants within each homogeneous area are obtained. A required soil moisture content for plants within the homogeneous area is calculated based on a difference between the required soil moisture content for plants within the planting area and the soil moisture content for plants within the homogeneous area. Types and quality of required fertilizers for plants are determined based on the plant status parameter for plants within the homogeneous area. Finally, an irrigation water and fertilizer solution required by plants within the homogeneous area is prepared by the water and fertilizer blending unit based on the required soil moisture content and the types and quality of the required fertilizers for plants within the homogeneous area. Plants within each homogeneous area are irrigated by the areal irrigation unit according to the irrigation water and fertilizer solution required by plants within the homogeneous area. In conclusion, the present disclosure realizes precision irrigation and fertilizer application for crops and significantly improves the agricultural production efficiency and the yield and quality of crops by an integrated automatic manner.

The flowcharts and block diagrams in the accompanying drawings show system architectures, functions, and operations that may be implemented by the devices, systems, methods, and computer program products according to a plurality of embodiments of the present disclosure. In this regard, each block in the flowcharts or block diagrams may represent a module, a program segment, or a part of code, and the module, the program segment, or the part of code includes one or more executable instructions for implementing specified logic functions. In some alternative implementations, functions marked in the blocks may also take place in an order different from the order marked in the accompanying drawings. For example, two consecutive blocks can actually be executed in parallel, or sometimes can be executed in the reverse order, depending on the functions involved.

It should also be noted that each block in the flowcharts and/or block diagrams and combinations of the blocks in the flowcharts and/or block diagrams may be implemented by hardware for executing specified functions or actions, such as a circuit or an application specific integrated circuit (ASIC), or may be implemented by a combination of hardware and software, such as firmware.

Although the present disclosure has been described in combination with the embodiments, those skilled in the art may understand and implement other changes of the embodiments of the present disclosure by checking the accompanying drawings, disclosures and appended claims during implementation of the present disclosure. In the claims, the word "comprising" does not exclude other components or step, and the word "a" or "an" does not exclude a plural case. A single processor or other units may implement a plurality of functions listed in the claims. Some measures are recorded in dependent claims that are different from one another. However, it does not mean that these measures cannot be combined together to achieve a desirable effect.

The embodiments of the present application have been described above, and the above description is exemplary, not exhaustive, and is not limited to the disclosed embodiments. It is apparent to those skilled in the art that many modifications and changes may be made without departing from the scope of the described embodiments. The terms used herein are selected to best explain principles of the embodiments, practical applications, or improvements to technologies in the market, or to enable other persons of ordinary skill in the art to understand the embodiments disclosed herein.

What is claimed is:

1. A system for multi-channel data acquisition and precision irrigation and fertilizer application control of crops, comprising:
a plant detection unit configured to perform the steps of:
obtaining a plurality of sampling points within a planting area; and
obtaining soil moisture contents and plant status parameters through a plurality of detection channels at the sampling points, respectively, wherein the plant status parameter comprises infrared light reflectance, visible light reflectance, and/or chlorophyll fluorescence;
a requirement pre-estimation unit configured to perform the steps of: obtaining a required soil moisture content for plants within the planting area;
dividing the planting area into a plurality of homogeneous areas according to the soil moisture content and the plant status parameter at each sampling point;
obtaining the soil moisture content and the plant status parameter for plants within each homogeneous area;
calculating a required soil moisture content for plants within the homogeneous area based on a difference between the required soil moisture content for plants within the planting area and the soil moisture content for plants within the homogeneous area; and
obtaining types and quality of required fertilizers for plants within the homogeneous area based on the plant status parameter for plants within the homogeneous area;
a water and fertilizer blending unit configured to perform the step of: blending an irrigation water and fertilizer solution required by plants within the homogeneous area based on the required soil moisture content and the types and quality of the required fertilizers for plants within the homogeneous area; and
an areal irrigation unit configured to perform the step of: irrigating plants within each homogeneous area according to the irrigation water and fertilizer solution required by plants within the homogeneous area;
wherein:
the step of dividing the planting area into a plurality of homogeneous areas according to the soil moisture content and the plant status parameter at each sampling point comprises:
obtaining the soil moisture content and the plant status parameter at each location within the planting area according to locations of the sampling points within the planting area and the soil moisture content and the plant status parameter at each sampling point;
obtaining a water and fertilizer detection status at each location within the planting area according to the soil moisture content and the plant status parameter at each location within the planting area; and
obtaining the plurality of homogeneous areas formed by locations having a same water and fertilizer detection status within the planting area according to the water and fertilizer detection status at each location within the planting area;
the obtaining the plurality of homogeneous areas formed by locations having a same water and fertilizer detection status within the planting area according to the water and fertilizer detection status at each location within the planting area comprises:
arranging the water and fertilizer detection status at each location within the planting area according to a set numerical value arrangement manner to obtain a water and fertilizer feature vector at each location within the planting area;
combining locations having a same water and fertilizer feature vector within the planting area into a homogeneous subarea;
selecting a plurality of homogeneous subareas from all the homogeneous subareas as reference homogeneous subareas;
obtaining a distance between a center point of the reference homogeneous subarea and a center point of other homogeneous subareas;
combining the other homogeneous subarea and the reference homogeneous subarea of which the center points are closest to each other into the homogeneous area;
obtaining a center point of the homogeneous area;
determining whether the center point of the homogeneous area overlaps the corresponding reference homogeneous subarea;
if yes, obtaining the homogeneous area; and
if no, taking the center point of the homogeneous area as an updated reference homogeneous subarea and updating the homogeneous area; and
the obtaining the plurality of homogeneous areas formed by locations having a same water and fertilizer detection status within the planting area according to the water and fertilizer detection status at each location within the planting area further comprises:
clustering a plurality of homogeneous areas having the same water and fertilizer feature vector and discrete from one another as the same homogeneous area.

2. The system according to claim 1, wherein the step of obtaining a plurality of sampling points within a planting area comprises:
obtaining a number of the sampling points;
obtaining a size of the planting area;
randomly dividing the planting area into a plurality of random areas different in size and shape based on the size of the planting area;
allocating the plurality of sampling points based on a ratio of the size of each random area to obtain a number of the sampling points within each random area; and
randomly selecting location points as sampling points within each random area according to the number of the sampling points within the random area.

3. The system according to claim 1, wherein the obtaining the soil moisture content and the plant status parameter at each location within the planting area according to locations of the sampling points within the planting area and the soil moisture content and the plant status parameter at each sampling point comprises:
gridding the planting area to obtain a plurality of square grid areas having a same size, wherein there is only one or no sampling point within the grid area;
for the grid area with the sampling point, using the soil moisture content and the plant status parameter at the sampling point as the soil moisture content and the plant status parameter of the grid area with the sampling point;

for the grid area with no sampling point, obtaining a plurality of sampling points adjacent to the grid area; and obtaining the soil moisture content and the plant status parameter of the grid area with no sampling point according to the soil moisture contents and the plant status parameters at the plurality of sampling points adjacent to the grid area with no sampling point.

4. The system according to claim 3, wherein the obtaining a plurality of sampling points adjacent to the grid area comprises:

dividing the planting area into four direction domains by two symmetry axes, perpendicular to each other, of the grid area; and taking the sampling points closest to a center point of the grid area as the plurality of sampling points adjacent to the grid area within each direction domain.

5. The system according to claim 3, wherein the obtaining the soil moisture content and the plant status parameter of the grid area with no sampling point according to the soil moisture contents and the plant status parameters at the plurality of sampling points adjacent to the grid area with no sampling point comprises:

selecting any point as an origin;

obtaining location vectors of adjacent ones of the plurality of sampling points according to the origin and locations of the plurality of sampling points adjacent to the grid area with no sampling point;

obtaining a location vector of the center point of the grid area with no sampling point according to the origin and a location of the center point of the grid area with no sampling point;

assigning weight coefficients to the location vectors of the adjacent ones of the plurality of sampling points such that a weighted vector sum of the location vectors of the adjacent ones of the plurality of sampling points is equal to the location vector of the center point of the grid area with no sampling point; and weighting and accumulating the soil moisture contents and the plant status parameters at the adjacent ones of the plurality of sampling points according to the weight coefficients to obtain the soil moisture content and the plant status parameter of the grid area with no sampling point.

6. The system according to claim 1, wherein the obtaining the soil moisture content and the plant status parameter for plants within each homogeneous area comprises:

obtaining the center point of the reference homogeneous subarea in the homogeneous area; and obtaining the soil moisture content and the plant status parameter at the sampling point closest to the center point of the corresponding reference homogeneous subarea in the homogeneous area as the soil moisture content and the plant status parameter for plants within the homogeneous area.

\* \* \* \* \*